No. 872,073. PATENTED NOV. 26, 1907.
J. G. MacGREGOR.
GRAVITY FILTRATION PLANT.
APPLICATION FILED MAY 13, 1907.
2 SHEETS—SHEET 1.
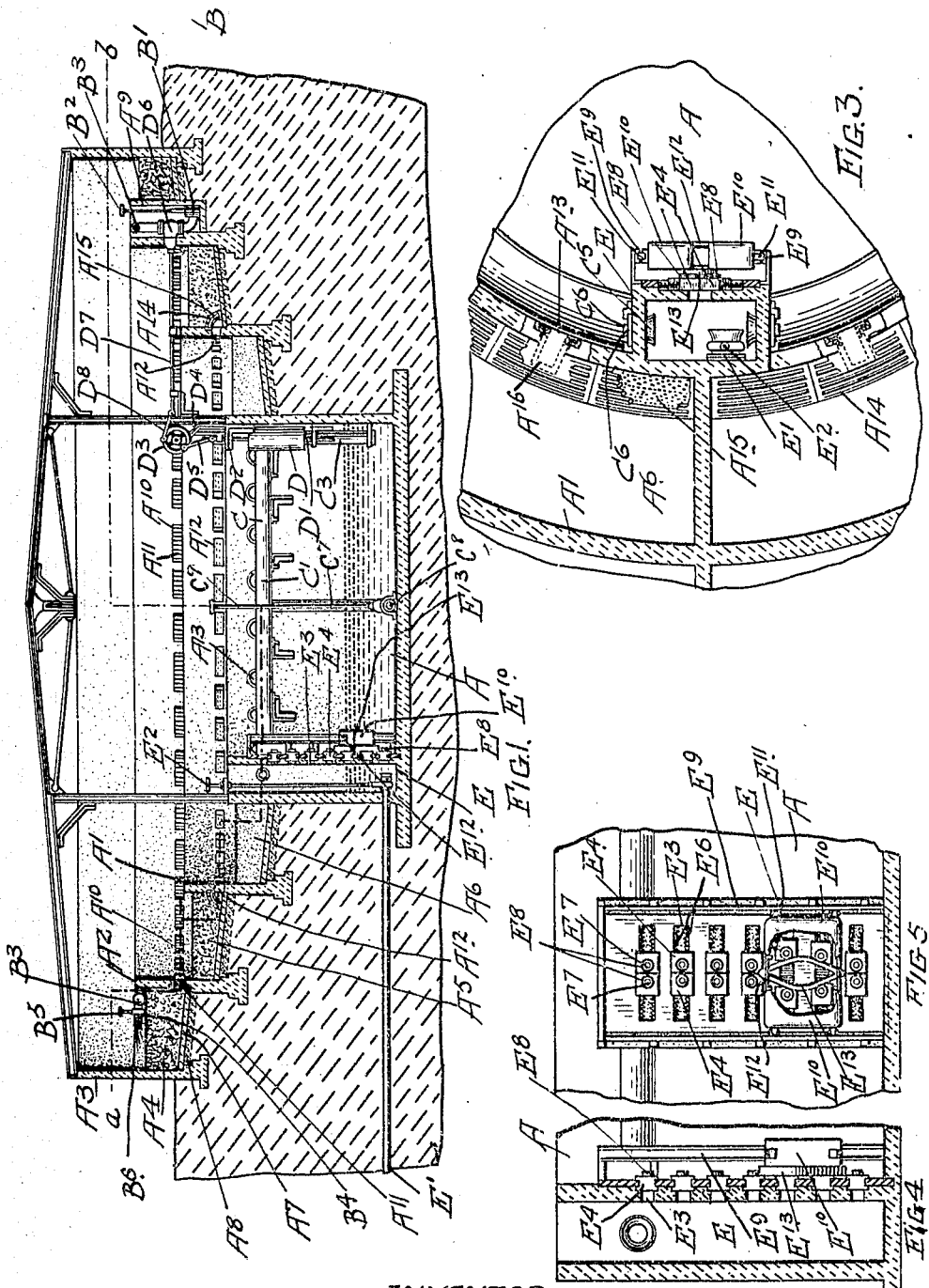
WITNESSES
INVENTOR
J. G. MacGregor No. 872,073. PATENTED NOV. 26, 1907.
J. G. MacGREGOR.
GRAVITY FILTRATION PLANT.
APPLICATION FILED MAY 13, 1907.
2 SHEETS—SHEET 2.
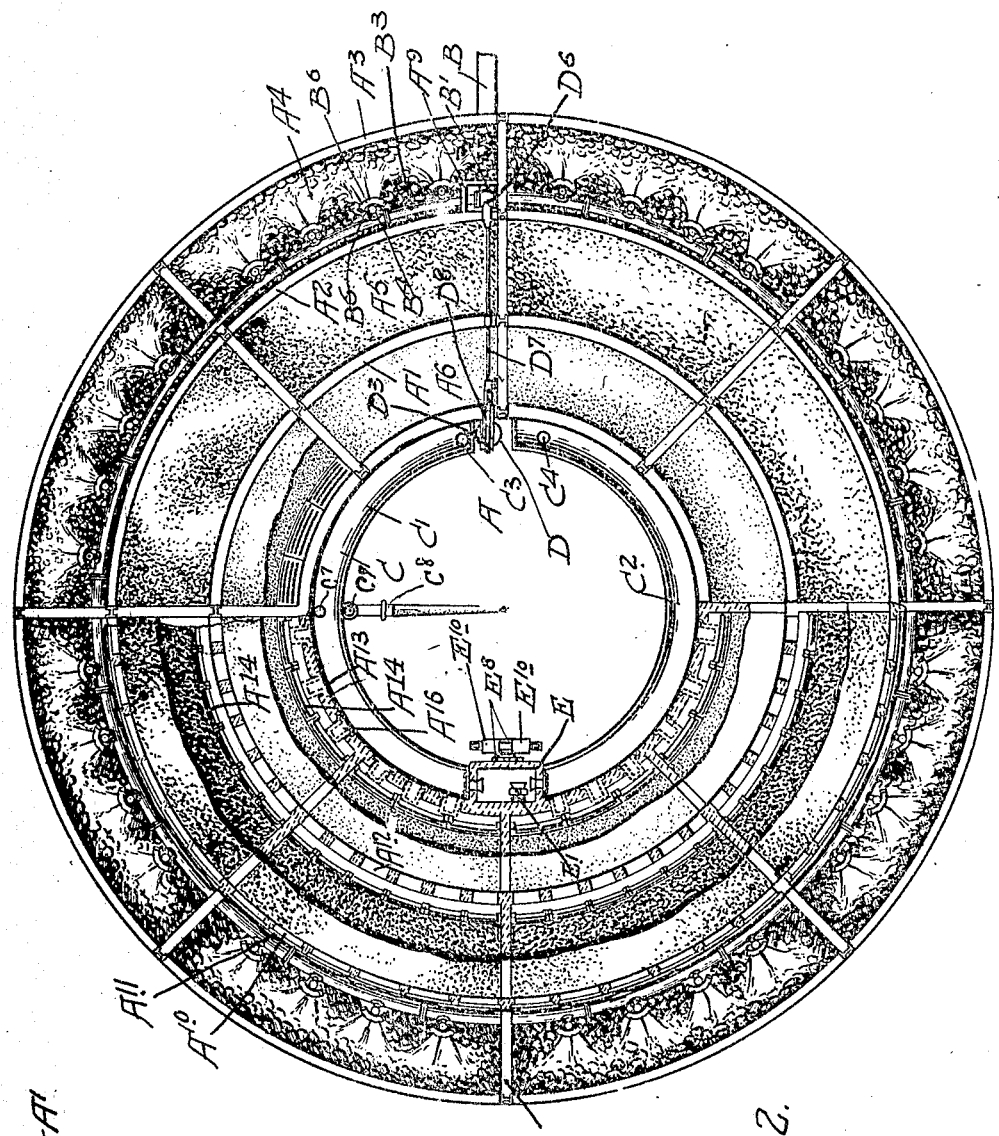
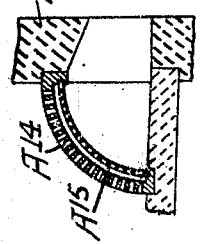
WITNESSES. INVENTOR.

UNITED STATES PATENT OFFICE.

JOHN GRANT MacGREGOR, OF GODERICH, ONTARIO, CANADA.

GRAVITY FILTRATION PLANT.

No. 872,073.      Specification of Letters Patent.     Patented Nov. 26, 1907.

Application filed May 13, 1907. Serial No. 373,413.

*To all whom it may concern:*

Be it known that I, JOHN GRANT MAC-GREGOR, of the town of Goderich, in the county of Huron, in the Province of Ontario, Canada, have invented certain new and useful Improvements in Gravity Filtration Plants, of which the following is the specification.

My invention relates to improvements in gravity filtration plants, and the object of the invention is to provide a filtration plant of this class adaptable both for small and large water supplies, in which the water passes through a maximum area of filtering material and in which expensive piping systems are dispensed with and it consists essentially of a central chamber forming a reservoir, a series of surrounding filter beds arranged in tiers ascending from the center outwardly, means for automatically controlling the supply of water to the outer filter bed operated by the rise of the water in the central reservoir, means for spraying the water evenly over the outer filter bed and means for drawing the supply of filtered water from the surface of the water in the reservoir, the parts all being arranged and constructed as described in the following specification.

Figure 1 is a vertical sectional view of my filtration plant. Fig. 2 is a plan view on the line $a$—$b$ Fig. 1. Fig. 3 is an enlarged plan detail of a portion of the inner filter bed, effluent chamber and central reservoir. Fig. 4 is a vertical sectional view through the effluent chamber. Fig. 5 is a front face view of the effluent chamber. Fig. 6 is a view of one of the quadrantal gratings.

In the drawings like letters of reference indicate corresponding parts in each figure.

A is the central chamber of the filter forming a reservoir for the filtered water and preferably circular in form.

Surrounding the central reservoir A are a series of annular walls $A'$, $A^2$ and $A^3$ arranged in tiers ascending outwardly from the center of the filter and connected together by radially extending walls 2.

Between the walls $A^3$ and $A^2$ is formed a filter bed $A^4$, of coarse material such as broken stone. Between the walls $A^2$ and $A'$ is formed a filter bed $A^5$ of finer material such as finely crushed limestone and sand. Between the wall $A'$ and the wall of the central reservoir is formed a filter bed $A^6$ of very fine material such as fine quartz sand. The filter beds $A^4$ $A^5$ and $A^6$ rest upon inclined concrete beds $A^7$ whereby the flow of the filtering water as it percolates through the beds is directed toward the center of the filter. The concrete bed $A^7$ rests upon an underlying bed of puddled clay $A^8$ whereby the bottom of the filter beds are made impervious to water.

B is the main feed pipe which leads into the chamber $A^9$ formed at the outer side of the wall $A^3$.

$B'$ is a gate valve operated by the hand wheel $B^2$ and designed to close the feed of the water entirely from the filter beds when desired.

$B^3$ is an annular pipe with which the feed pipe B communicates. The pipe $B^3$ extends around and is suitably supported over the inner side of the filter bed $A^4$.

$B^4$ are a series of outlet pipes extending radially outwardly from the annular pipe $B^3$ and being provided with valves $B^5$ and are shaped perforated nozzles $B^6$.

The feed of the water into the pipe $B^3$ is automatically controlled by the rise and fall of the water in the central reservoir by mechanism which I will hereinafter describe.

The annular wall $A^3$ is provided with a series of openings $A^{10}$ leading from between the walls $A^2$ and $A^3$ on a level with the bottom of the filter bed $A^4$ through the wall $A^3$ to a point above the filter bed $A^5$. Similarly $A^{12}$ are openings leading from between the walls $A^3$ and $A'$ from a point on a level with the bottom of the filter bed $A^5$ through the wall $A'$ to a point above the filter bed $A^6$.

$A^{13}$ are openings preferably annular leading into the central chamber A from between the walls $A'$ and the walls of the chamber A from a point on a level with the filter bed $A^6$.

The openings $A^{10}$ are provided with flat gratings $A^{11}$ to support the material forming the filter bed $A^4$.

$A^{14}$ are gratings (see Figs. 6 and 3) of a quadrantal shape in cross section, suitably embedded in the concrete and designed to extend over the openings $A^{12}$ and $A^{13}$ and support the filtering material forming the filter beds $A^5$ and $A^6$. $A^{15}$ are screens also of a quadrantal sectional formation and contained in grooves formed in the frames of the gratings $A^{14}$. By this construction the screen is completely protected from the weight of the filtering material forming the filter beds. The openings $A^{13}$ are also provided with duplex screens $A^{16}$ formed by an outer and inner cylindrical screen formed preferably of copper wire cloth of a very fine mesh.

C is a trough extending around the inside of the wall of the chamber A beneath the openings $A^{13}$ and formed in semicircular sections $C'$ and $C^2$ from one end of which depend the outlet pipes $C^3$ and $C^4$.

Upon opening the pipe $B^2$ water is fed from the pipe B in the annular pipe $B^3$. The water passes from the annular pipe $B^3$ through the outlet pipe $B^4$ and the spraying nozzle $B^6$ by which the water is sprayed evenly over the outer bed $A^4$ the sprays being individually controlled by the valves $B^5$. The water percolates down through the bed $A^4$ passes through the openings $A^{10}$ then percolates through the finer bed $A^5$ then passes through the screen $A^{15}$ and opening $A^{12}$, then through the very fine bed $A^6$ and finally passes through the duplex screens $A^{16}$ into the receiving trough C from whence it passes through the pipes $C^3$ and $C^4$ into the center chamber A.

I will now describe the means by which the supply of water fed to the filter is controlled by the amount of water in the reservoir A.

D is a float secured to the vertical rod $D'$ supported in brackets $D^2$.

$D^3$ is a crank-wheel suitably supported by and journaled on the bracket $D^4$.

$D^5$ is a link rod connecting the rod $D'$ to the wheel $D^3$.

$D^6$ is a valve located on the vertical portion of the pipe B, and $D^7$ is a longitudinally movable valve rod therefor.

$D^8$ are links connecting the valve rod $D^7$ with the crank wheel $D^3$.

As the water rises in the chamber A it lifts the float D thereby turning the crank wheel $D^3$ through the link $D^5$ and rod $D'$ and thereby imparting longitudinal movement to the rod $D^7$ through the link $D^8$ thereby closing the valve $D^6$. Contrariwise as the water recedes in the chamber the float falls and the valve is again open to feed the water into the filter.

I will now describe the means by which the water is drawn from the chamber A.

E is the effluent chamber from which the water is drawn off by means of the outlet pipe $E'$ which is controlled by the valve $E^2$.

$E^3$ are a series of openings formed in the front face of the effluent chamber.

$E^4$ are series of gates slidably held and arranged in pairs in front of the openings $E^3$ and spring held together by the compression springs $E^6$ suitably held between the outside of each gate and the ends of the openings $E^3$ (see Fig. 5). Each gate is provided with a pin $E^7$ on which is a roller $E^8$.

$E^9$ are vertical guideways suitably supported within the chamber A.

$E^{10}$ are a pair of floats located in front of the effluent chamber to each side of the center thereof. On the side of the floats are journaled rollers $E^{11}$ which move vertically within the guide-ways $E^9$. The floats are held together centrally by the connecting bars $E^{12}$.

$E^{13}$ is a substantially diamond shaped cam frame secured to the bars $E^{12}$ and designed to rise and fall with the float and engage with the rollers $E^8$. The upper point of the frame enters between and forces each pair of rollers $E^8$ apart as the frame rises with the rise of the water in the chamber A thereby separating the gates against the pressure of the springs $E^6$ so as to allow the water to flow through one of the openings $E^3$. It will be seen that as the float and frame rise with the water the gate that is upon the same level as the water is opened and those below the water level close as the water rises carrying the float with it. The same operation occurs through the fall of the water in the chamber A.

For the purpose of flushing out the central chamber A I provide inlets $C^5$ from the ends of the trough entering the effluent chamber which are controlled by the valves $C^6$.

$C^7$ is an overflow pipe for the chamber A, and $C^8$ is an outlet pipe controlled by the valve $C^9$ through which the water passes when flushing the chamber.

What I claim as my invention is:

1. A filtration plant comprising a central chamber forming a reservoir, a filter bed arranged in a series one without the other, each bed completely surrounding the central chamber, a water feed pipe, an annular pipe extending over the outer filter bed and with which the feed pipe communicates, radial pipes extending from the annular pipe and provided with controlling valves and arc-shaped perforated nozzles secured to the end of the radial pipes as and for the purpose specified.

2. In a filtration plant, the combination with the annular filter beds, of an annular pipe provided with a suitable water inlet, radial pipes extending from the annular pipe and terminating in arc-shaped perforated nozzles as and for the purpose specified.

3. A filtration plant comprising a central chamber forming a reservoir, filter beds arranged in a series one without the other, each bed completely surrounding the central chamber, a water feed pipe an annular pipe extending over the outer filter bed and with which the feed pipe communicates, and having a series of outlet pipes provided with spray nozzles and controlling valves, as and for the purpose specified.

4. A filter plant comprising a central chamber forming a reservoir, a series of annular walls arranged in outwardly ascending tiers and surrounding the central chamber and having openings extending through the walls at the base, gratings quadrantal in cross section and comprising an outer barred grate and an inner perforated screen, filter beds located between the walls and extending over the gratings and means for feeding the water over the surface of the outer bed as and for the purpose specified.

5. In a filtration plant the combination with the central reservoir, the surrounding filter beds and the feed pipe, of an effluent chamber located in the central chamber, an outlet pipe therefrom, a series of openings in the wall of the effluent chamber arranged vertically, gates therefor and means for maintaining that gate in an open position which is on a level with the water level in the central chamber and for closing the same, as the water changes its level, as and for the purpose specified.

6. In a filtration plant, the combination with the central reservoir, the surrounding filter beds and the feed pipe, of an effluent chamber, an outlet pipe therefrom, a series of vertically arranged openings in the wall of the effluent chamber, gates therefor, a float vertically movable in guide-ways and means operated by the float for opening the gate on the water level and for closing the same as the water changes its level, as and for the purpose specified.

7. In a filtration plant, the combination with the central reservoir the surrounding filter beds and the feed pipe, of an effluent chamber, an outlet pipe therefrom, a series of vertically arranged openings in the wall of the effluent chamber, gates consisting of two members springheld together in suitable guides and closing centrally of the openings, a float held in suitable guides in the central chamber and means operated by the rising float for spreading the gate members apart, as and for the purpose specified.

8. In a filtration plant, the combination with the central reservoir, the surrounding filter beds and the feed pipe, of an effluent chamber, an outlet pipe therefrom, a series of vertically arranged openings in the wall of the chamber, gates consisting of two members provided with cam rollers and spring held together in suitable guideways and designed to close centrally of the said openings, a pair of floats connected together by bars, guides for the floats, a diamond shaped cam frame designed to enter between the rollers and spread the gates apart, as and for the purpose specified.

9. In a filter plant, the combination with the filter beds and the walls thereof, of a central chamber surrounded by the filter beds having openings in the wall thereof near the top, a trough surrounding the chamber, an effluent chamber, ports communicating with the trough, valves for controlling the ports, ports leading into the central chamber, means for opening and closing the ports controlled by the rise and fall of the water in the central chamber, outlet pipes from the trough into the central chamber, an outlet pipe from the central chamber, and an overflow pipe extending from the top of the reservoir into the outlet pipe as and for the purpose specified.

JOHN GRANT MacGREGOR.

Witnesses:
B. BOYD,
A. CRIGHTON.